United States Patent
Ciesielczyk et al.

(10) Patent No.: US 12,358,087 B2
(45) Date of Patent: Jul. 15, 2025

(54) SPACER DRONE INSTALL SYSTEM

(71) Applicant: PREFORMED LINE PRODUCTS CO., Mayfield Village, OH (US)

(72) Inventors: Benjamin Franklin Ciesielczyk, Madison, OH (US); Douglas Bell, Mayfield Heights, OH (US); John Markiewicz, Mentor, OH (US)

(73) Assignee: Preformed Line Products Co., Mayfield Village, OH (US)

( * ) Notice: Subject to any disclaimer, the term of this patent is extended or adjusted under 35 U.S.C. 154(b) by 240 days.

(21) Appl. No.: 17/964,821

(22) Filed: Oct. 12, 2022

(65) Prior Publication Data

US 2023/0116365 A1    Apr. 13, 2023

Related U.S. Application Data

(60) Provisional application No. 63/254,761, filed on Oct. 12, 2021.

(51) Int. Cl.
| | |
|---|---|
| *H02G 7/12* | (2006.01) |
| *B23P 19/06* | (2006.01) |
| *B64C 39/02* | (2023.01) |
| *B64U 10/13* | (2023.01) |
| *F16B 9/02* | (2006.01) |
| *H02G 1/02* | (2006.01) |
| *B64U 101/00* | (2023.01) |
| *B64U 101/25* | (2023.01) |

(52) U.S. Cl.
CPC ............ *B23P 19/06* (2013.01); *B64C 39/024* (2013.01); *B64U 10/13* (2023.01); *F16B 9/02* (2013.01); *H02G 1/02* (2013.01); *H02G 7/12* (2013.01); *B64U 2101/00* (2023.01); *B64U 2101/25* (2023.01); *B64U 2201/10* (2023.01)

(58) Field of Classification Search
None
See application file for complete search history.

(56) References Cited

U.S. PATENT DOCUMENTS

| | | | | |
|---|---|---|---|---|
| 2016/0344174 | A1* | 11/2016 | Murr | H02G 7/12 |
| 2019/0011934 | A1* | 1/2019 | DeBitetto | G01C 21/005 |
| 2021/0399541 | A1* | 12/2021 | Johansen | B64D 1/02 |
| 2022/0392672 | A1* | 12/2022 | Getman | B64U 50/31 |
| 2023/0109707 | A1* | 4/2023 | Bell | B64C 39/024 |
| | | | | 700/245 |

FOREIGN PATENT DOCUMENTS

| | | |
|---|---|---|
| CN | 110165599 A | 8/2019 |
| CN | 111193220 A | 5/2020 |
| EP | 3319190 A1 * | 5/2018 |
| JP | 2000228819 A | 8/2000 |

OTHER PUBLICATIONS

International Search Report; Corresponding International Patent Application No. PCT/US2022/046479, mailed Feb. 8, 2023; 3 Pgs.

* cited by examiner

*Primary Examiner* — Krystal Robinson
(74) *Attorney, Agent, or Firm* — Cooper Legal Group, LLC

(57) ABSTRACT

One or more system and associated methods for installing a line spacer upon adjacent lines that are suspended are provided. A system includes a portion for holding and releasing the line spacer onto the lines. The system includes a portion for actuating securing portions of the line spacer to secure the line spacer upon the lines. The system includes a flying drone portion for levitation of the portion for holding and the portion for articulating to the lines.

20 Claims, 6 Drawing Sheets

SPACER DRONE INSTALL SYSTEM

RELATED APPLICATION(S)

This application claims priority to provisional applications U.S. 63/254,761, filed on Oct. 12, 2021, entitled "ROBOT INSTALLED POWER LINE HARDWARE", U.S. 63/254,763, filed on Oct. 12, 2021, entitled "DRONE INSTALLED BOLTED HARDWARE", U.S. 63/254,767, filed on Oct. 12, 2021, entitled "TWIN SPACER DRONE INSTALL SYSTEM", U.S. 63/254,774, filed on Oct. 12, 2021, entitled "SPACER END CLAMP", all of which are incorporated by reference herein in their entirety.

FIELD

The present disclosure relates generally to in situ work upon utility lines, such as power/communication lines (e.g., a power transmission line). In an example, the present disclosure relates to in situ installation of hardware equipment onto a utility line.

BACKGROUND

Many power/communication lines extend in a suspended manner, in air, by towers, poles or the line. In situ (i.e., in place) work upon such a power/communication line thus involves work at location(s) spaced up and away from terrain (i.e., spaced up and away from ground, building(s), water or the like).

In situ work upon such a power/communication line may be performed by one or more linemen (generally line technicians), possibly with the aid of hot stick(s) for safety. Performance of work by a line technician often includes placing the line technician within a working distance of the power/communication line upon which work is performed. Such placement of a line technician within a working distance of a power/communication line may include the use of a ladder, a lift apparatus (e.g., a bucket truck), a helicopter, or similar.

Working along an extended length of such a power/communication line may include a need to move/reposition the device (e.g., ladder, lift apparatus, helicopter, or similar) used to place the line technician within a working distance of the power/communication line.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In accordance with an aspect, the present disclosure provides an automated drone system for installing a line spacer upon adjacent lines. The system includes a portion for holding and releasing the line spacer onto the lines. The system includes a portion for actuating securing portions of the line spacer to secure the line spacer upon the lines. The system includes a flying drone portion for levitation of the portion for holding and the portion for articulating to the lines.

In accordance with an aspect, the present disclosure provides a method of installing a line spacer upon adjacent lines with a system. The method includes flying the system, via operation of a drone portion of the system, to levitate the system to the lines. The method includes holding, via a holding portion of the system, the line spacer. The method includes releasing the line spacer from the holding portion onto the lines. The method includes actuating securing portions, via operation of a portion of the system, of the line spacer to secure the line spacer upon the lines.

In accordance with an aspect, the present disclosure provides an automated drone system for installing a line spacer upon adjacent lines. The system includes a portion for holding and releasing the line spacer onto the lines such a first portion of the line spacer is secured to a first line of the adjacent lines and a second portion of the line spacer is secured to a second line of the adjacent lines. The system includes a flying drone portion for levitation of the portion for holding to the lines.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Figure 1:
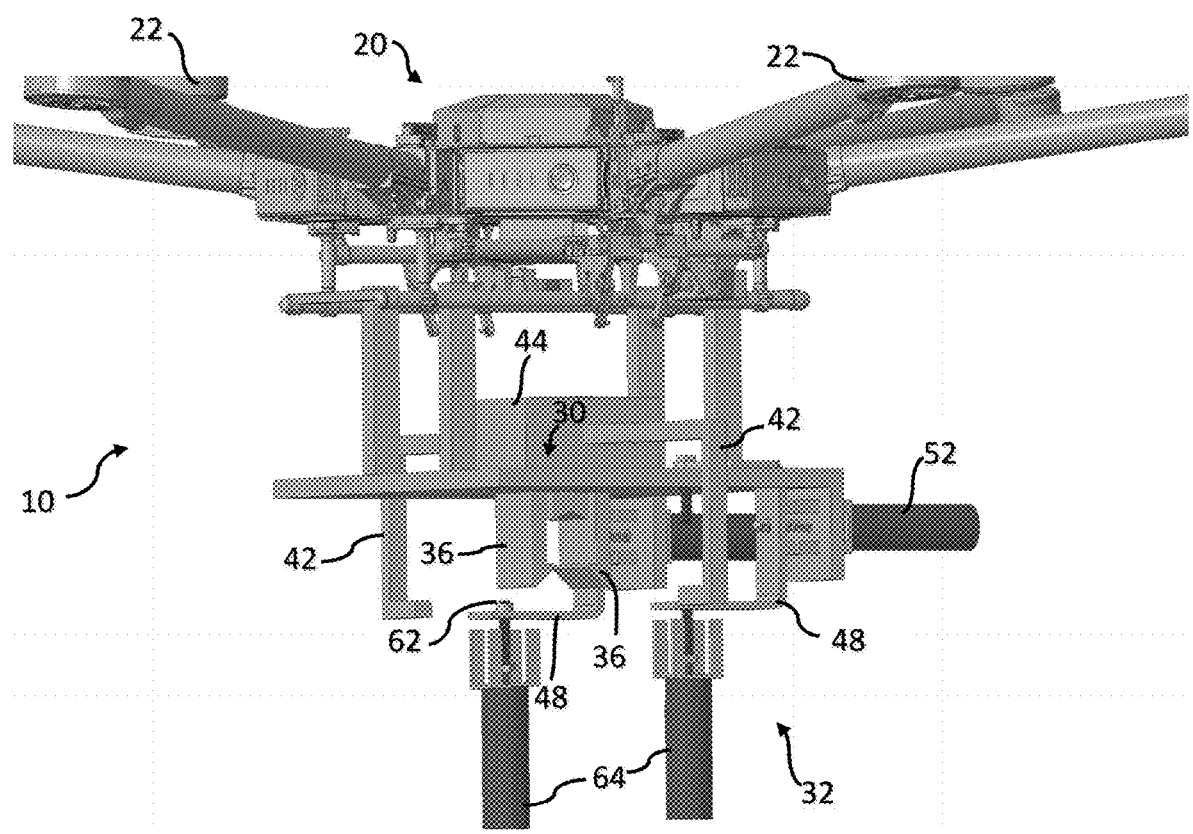
FIG. 1 is a partially truncated illustration of an example automated drone system to install an item, such as a line spacer, in accordance with at least one aspect of the present disclosure.

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

Certain terminology is used herein for convenience only and is not to be taken as a limitation on the disclosed subject matter. Relative language used herein is best understood with reference to the drawings, in which like numerals are used to identify like or similar items. Further, in the drawings, certain features may be shown in somewhat schematic form. The drawing sheets, and content contained thereon, are incorporated into this specification, and thus the patent application, by reference.

The following subject matter may be embodied in a variety of different forms, such as methods, devices, components, and/or systems. Accordingly, this subject matter is not intended to be construed as limited to any illustrative embodiments set forth herein as examples. Rather, the embodiments are provided herein merely to be illustrative.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Herein the term line is to be accorded a broad interpretation. The line may be a cable or the like. The line may include metal (e.g., copper, aluminum or the like) or other materials (e.g., fiber). Also, the line may be for transmission of electrical energy, transmission of communications or other functions. The line is suspended in air, typically at a height that increases challenge of accessing the line and extends for an expanse that increases challenge of accessing the line. The line may generally be considered a utility line. Such includes a transmission line and/or similar (e.g., suspended by utility pole, etc.).

In accordance with an aspect, the present disclosure provides an automated drone system for installing (e.g., placing, locating, securing, affixing, etc.) a line spacer upon adjacent suspended lines. The system includes a flying drone portion for levitation of the system to the location on the lines. The system includes a portion for holding and releasing the line spacer onto the lines. The system includes a portion for actuating securing portions of the line spacer to secure the line spacer upon the lines. Also, the present disclosure provides a method of installing a line spacer upon adjacent suspended lines with a system. The method includes flying the system, via operation of a drone portion of the system, to levitate the system to the location on the lines. The method includes holding, via a portion of the system, the line spacer. The method includes releasing the line spacer from the portion for holding the line spacer onto the lines. The method includes actuating securing portions, via operation of a portion of the system, of the line spacer to secure the line spacer upon the lines.

Line spacers may be used in association with lines and in particular electrical transmission conductor lines that extend in a bundle (i.e., two or more extending lines). The line spacers help to maintain lines spaced at a fixed distance apart from one another. Such spacing helps to prevent the lines from damaging each other. Within some examples, damage may occur without such spacing and during wind induced sway, line vibration events or the like. Within some examples, several spacers may be placed along a span between adjacent support towers/poles. Within some examples, such line spacers may be located approximately 30-60 meters apart from each other along the lines of the bundle.

A typical line spacer includes portions that are actuatable to the line spacer upon the lines. It is to be appreciated that the actuatable portions of the line spacer may be varied and that such variations are not limitations upon the present disclosure. It is to be understood that the present disclosure is to be interpreted as being broad to cover the variations of line spacer and thus it is to be understood that the automated drone system and associated method may be varied to operate upon the variations of the line spacers.

Typically, installation of line spacers requires direct connection from a line worker (e.g., a lineman or line technician) in order to be installed. In some circumstances, the line technician may need to climb a pole or ladder. The line technician may also use a hot stick or other device that enables them to install the hardware from a distance. The line technician may also be lifted with a helicopter, or work out of a bucket truck. All of these methods require a direct connection between the line technician and the hardware being installed. All of these methods are physically demanding and include several safety risks to the line technician and the line itself.

Figure 2:
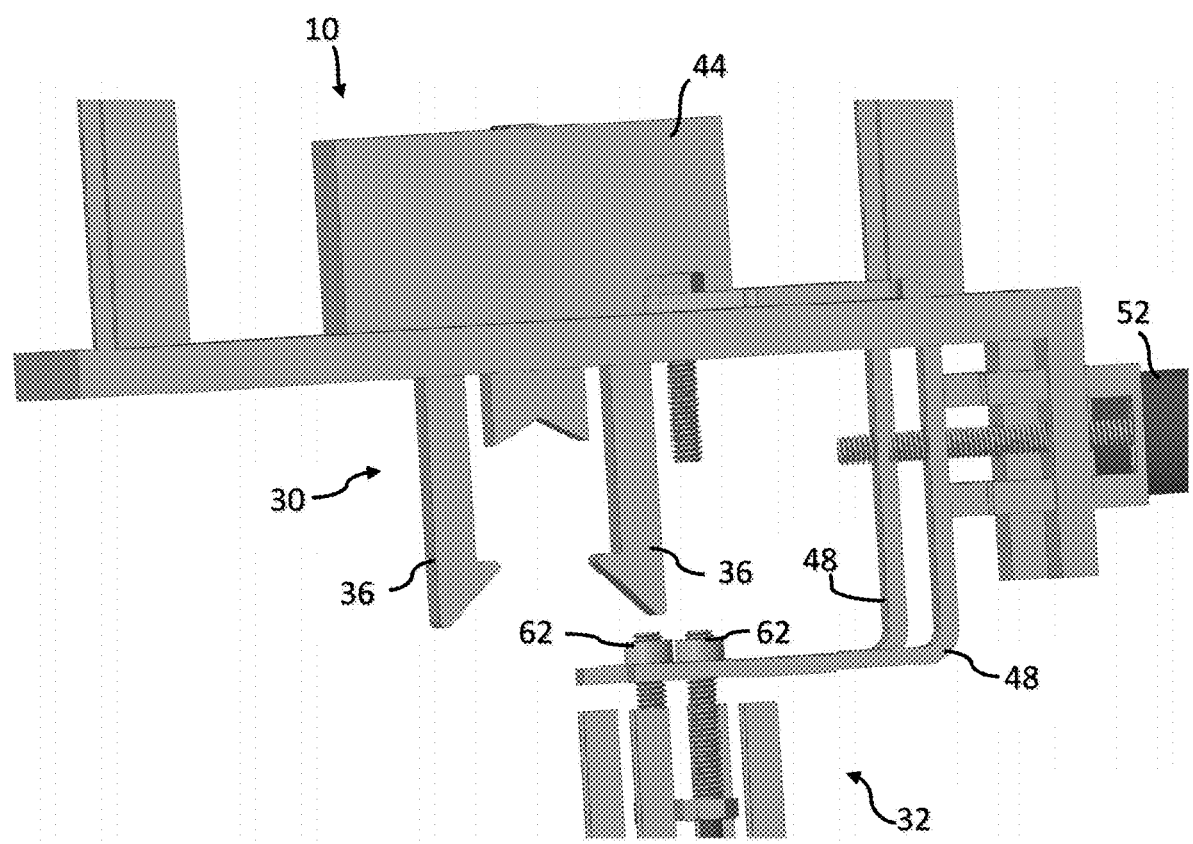
FIG. 2 is an enlarged and further schematized, illustration of an example portion of the drone system of FIG. 1, showing a portion for holding and releasing the spacer, in accordance with at least one aspect of the present disclosure.
Figure 3:
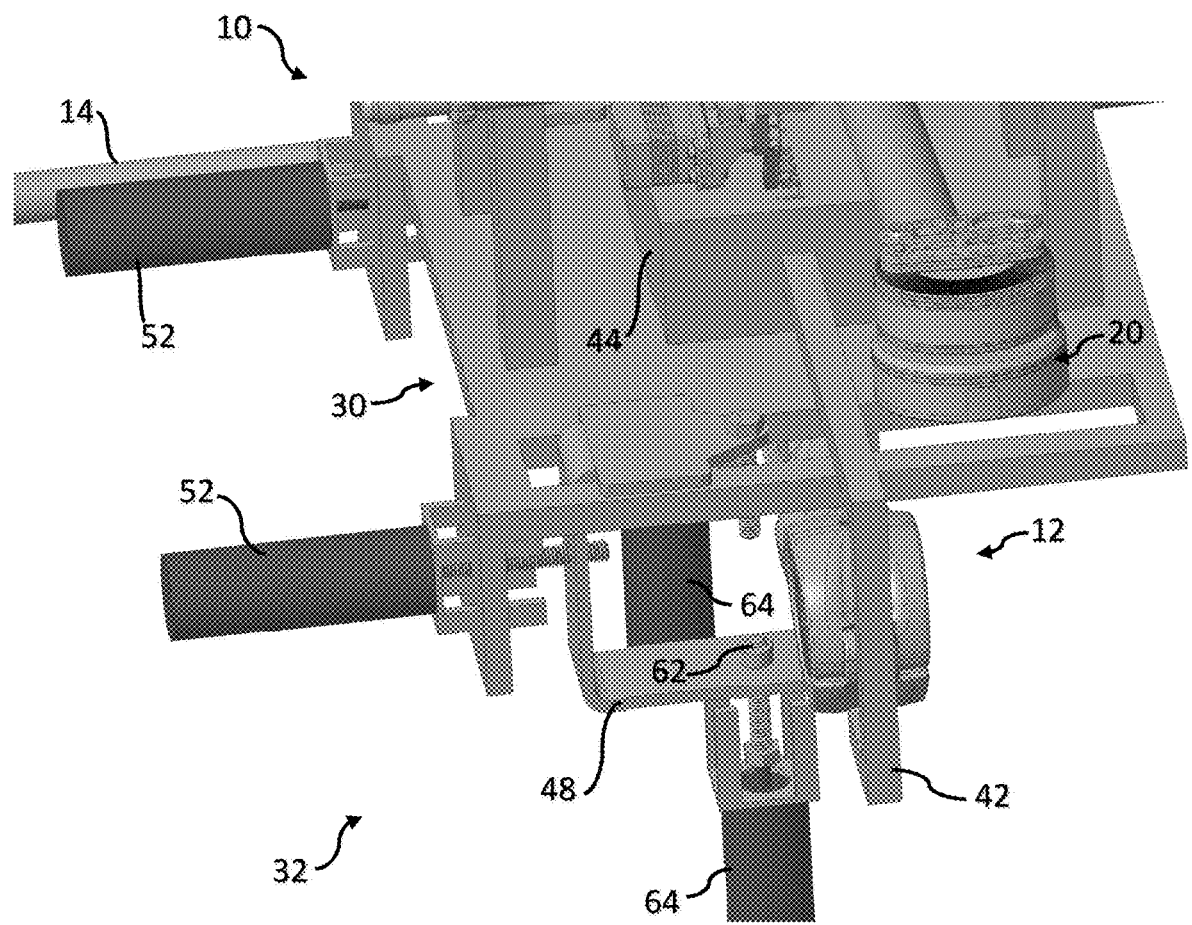
FIG. 3 is an enlarged, reverse-angle illustration of an example portion of the drone system of FIG. 1, showing portions for providing motive force, in accordance with at least one aspect of the present disclosure.
Figure 4:
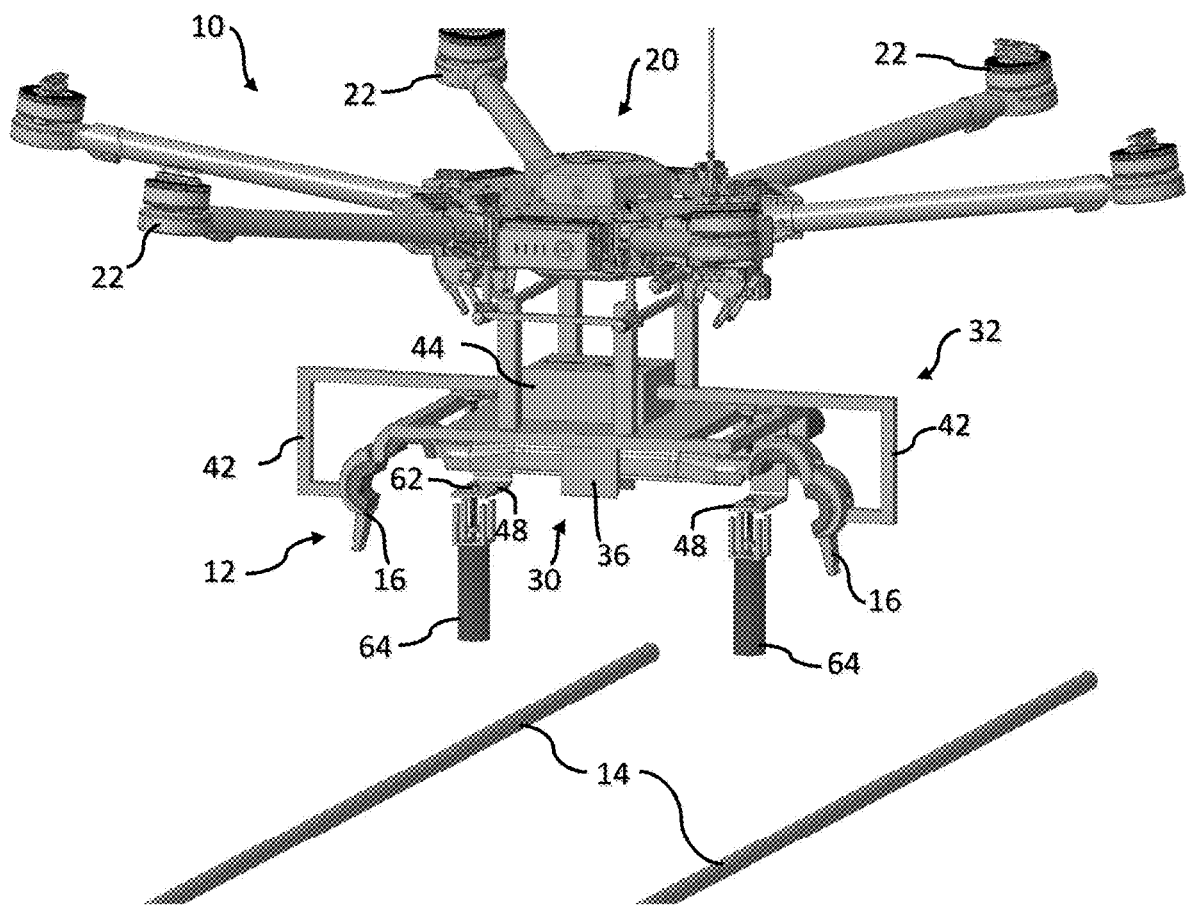
FIG. 4 is an illustration of the drone system of FIG. 1, and an associated example spacer about to be installed upon lines in accordance with at least one aspect of the present disclosure.
Figure 5:
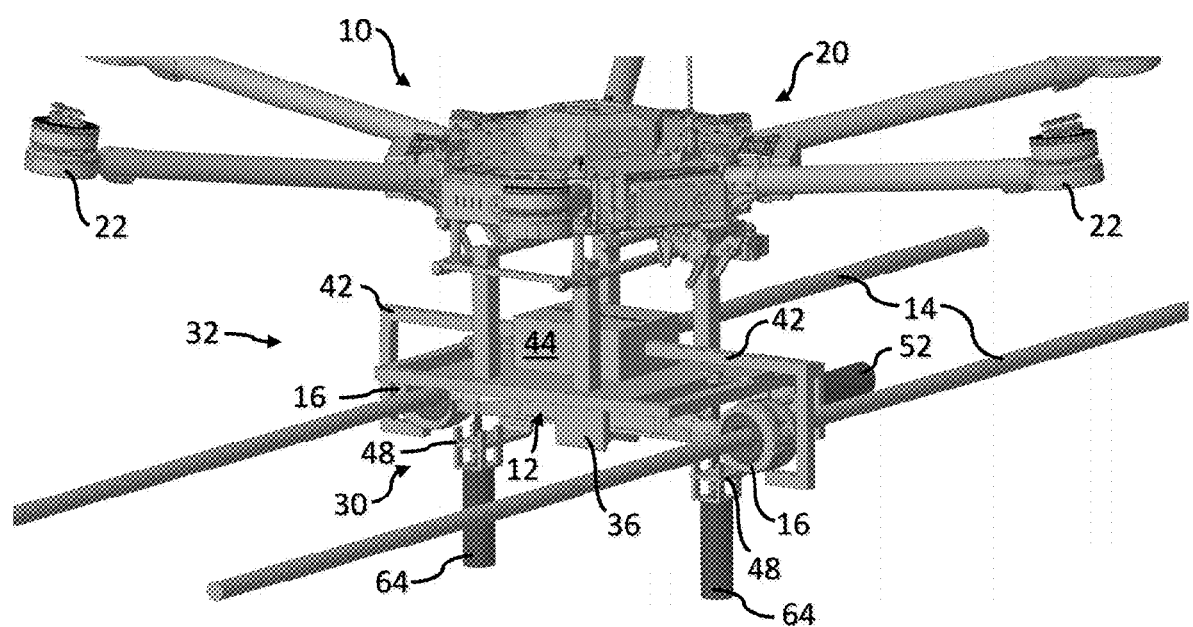
FIG. 5 is an illustration similar to FIG. 4, during installation of the spacer upon the lines in accordance with at least one aspect of the present disclosure.
Figure 6:
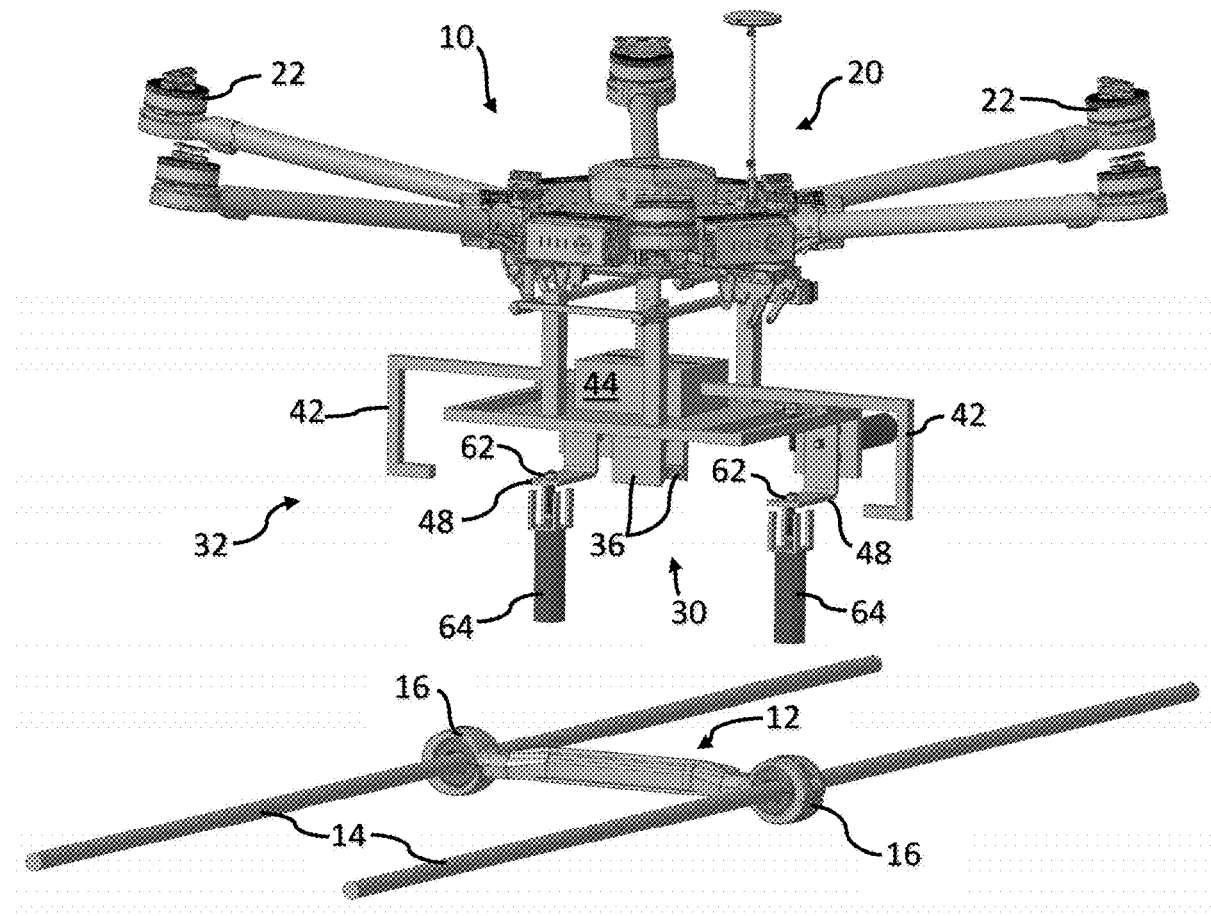
FIG. 6 is an illustration similar to FIG. 5, but after installation of the spacer and with the drone system departing in accordance with at least one aspect of the present disclosure.

FIGS. 1-6 show an example of an automated drone system 10 for installing an example item 12 (e.g., a line spacer 12, see FIGS. 4-6) upon adjacent suspended lines 14 (see FIGS. 4-6). It is to be appreciated that the drone system 10 may have remotely (e.g., controlled by a line technician located on ground via radio transmission), have autonomous operation, or a combination of remote control and autonomous operation. Note that the drone system 10 presents just one example embodiment of a way to use a drone to install this type of hardware, e.g., a line spacer 12. Variations that may achieve the same or similar task are contemplated and such are within the scope of the present disclosure.

Within an example, the line spacer 12 is for spacing two lines 14 (e.g., see FIG. 6). Portions of the line spacer 12 that secure the line spacer onto the lines 14 includes clamp portions 16. The clamp portions 16 are an example securing portion to secure onto the lines 14. It is to be appreciated that the line spacer 12, and portions thereof (e.g., the clamp portions 16) may be varied. Of course, such variations need not be specific limitations upon the present disclosure. It is to be appreciated that the drone system 10, and portions thereof, may be varied to accommodate variations of the line spacer. Such variations of the drone system 10 are contemplated and within the scope of the present disclosure.

As can be appreciated, the drone system 10 includes a flying drone portion 20 for levitation of the drone system to the location on the lines 14. See that the shown example of the flying drone portion 20 includes multiple rotor prop portions 22. It is to be noted that the prop portions are omitted from the figures to reduce clutter. Of course, such is simply an example. A different number of rotor prop portions or even a single rotor prop portion may be utilized. It is to be appreciated that the flying drone portion 20 may be varied and that such variation is within the scope of the present disclosure.

Within the shown example of the drone system 10, supported below the flying drone portion 20, the system includes: a portion 30 holding the line spacer 12 and releasing such spacer onto the lines at an appropriate time, and a portion 32 for actuating/securing portions (e.g., the clamp portions 16 of the shown example) of the spacer 12 to secure the line spacer upon the lines.

Attention is directed to the sequence of FIGS. 4-6 which show the drone system 10 flying an example of the spacer 12 to a location on two lines 14 (i.e., FIG. 4), securing the spacer onto the lines (FIG. 5), and then the system flying off/away from the lines after the spacer is installed/secured (FIG. 6).

As shown in FIG. 2, the portion 30 for holding is configured to hold and then release the spacer 12 onto the two lines 14. It is to be appreciated that the portion 30 for holding and releasing is somewhat schematically shown. Variation is contemplated and within the scope of the present disclosure. Within the shown example, the portion 30 for holding and releasing is a passive device using two resilient holding fingers 36 that are resilient and deflect to allow the spacer 12 to snap in between the holding arms and be held in place. Once the spacer 12 is fully installed, a large upward force will cause the holding fingers 36 to deflect and release the spacer. Of course, variation is possible and within the scope of the present disclosure. For example, this portion/system could also be mechanically controlled in other embodiments.

Attention is now directed to the portion 32 for actuating/securing portions (e.g., the clamp portions 16 of the shown example) of the spacer 12. FIGS. 4 and 5 show, somewhat schematically, arms 42 that operate to close the clamp portions 16 of the spacer 12 onto the lines 14. The arms 42 are movable to accomplish the task of closing the clamp portions 16. The movement of the arms 42 may be any needed movement and may be accomplished in any desired manner. It is to be appreciated that such components/structures (e.g., arms 42) may be varied dependent upon the specifics of the spacer 12 and the clamp portions 16 thereof. Such variations are contemplated and within the scope of the present disclosure.

Within the shown example, the arms 42 are linearly moved inwardly to engage and close the clamp portions 16. Within the shown example, the portion 32 for actuating/securing portions also includes a linear actuator control arrangement 44. The control arrangement 44 has a motorized mechanism that extends or retracts the two arms 42. Operation of the control arrangement 44 could be selectively controller via remote control or automated via inclusion of a more complex sensor/control system.

Within an example, the two arms 42 may also be used to hold the clamp portions 16 of the spacer 12 open while the drone system 10 is flying so that the lines 14 can be easily located into the clamp portions. Once in vicinity of the two lines 14, the drone system 10 may be lowered toward the two lines and the clamp portions 16 rest upon the lines. The arms 42 are then pulled inward by the control arrangement 44 (e.g., the linear actuator therein is operated), causing the clamp portions 16 to close onto the lines 14. Again, variation is contemplated and within the scope of the present disclosure.

FIG. 3 shows further components/structures of the portion 32 for actuating/securing portions (e.g., the clamp portions 16 of the shown example) of the spacer 12. Specifically, components/structures for securing, installing, etc. the clamp portions 16 onto the lines 14. It is to be appreciated that such components/structures may be varied dependent upon the specifics of the spacer 12 and the clamp portions 16 thereof. Such variations of the components/structures of the portion 32 for securing the clamp portions 16 are contemplated and within the scope of the present disclosure.

Within the shown example, moveable brackets 48 are provided that may be selective moved from locations not beneath the spacer 12, to locations beneath the spacer while the spacer is still held by the fingers 36, and then moved back to locations not beneath the spacer 12. Slots may be provided to guide the movements and such movements may be a sliding movement.

Electric motors 52 are provided to move the moveable brackets 48. The electric motors 52 may have a variety of constructions and configurations, such as gear reduction units, etc. The motors 52 are operated to control/drive leadscrews that provide for the movement of the brackets 48.

The brackets 48 and the motors 52 provide a compression module. Specifically, as the brackets 48 move, the brackets cam to press/squeeze upon the clamp portions 16. As such, there is a movement (e.g., a sliding motion) of the brackets 48 of the compression modules that cam under the clamp portions 16. Such pressing/squeezing forces the clamp portions 16 into a position onto the lines 14 such that the clamp portions are ready to be fixedly secured onto the lines.

The components/structures for securing the clamp portions 16 also includes a driver head/lead screw 62 and associated electric motors 64 at the end portion of each bracket 48. When the brackets 48 cam to press/squeeze upon the clamp portions 16, each driver head/lead screw 62 is aligned/centered relative to a respective latching/locking member (e.g., twist lock, bolt or the like) on the clamp portions. The motors 64 are then actuated to rotate/drive respective latching/locking member to lock the spacer 12 in place onto the lines 14 and completing the installation.

The compression modules (e.g., the brackets 48 and the motors 64 located thereon) must be slid back, away when first placing (e.g., clipping) the spacer 12 into the portion 30 (e.g., fingers 36) for holding the spacer while the drone system 10 is on/at the ground. When the drone system 10 is in the air and correctly positioned over the lines 14, the compression module (e.g., the brackets 48 and the motors 64 located thereon) slides forward via the motors 52.

With regard to the steps of the method of securing the spacer 12 onto the lines 14, see that in FIG. 5, the spacer 12 is being locked onto the lines 14. Notice the two arms 42 have been pulled relatively inward by the linear actuator of the control arrangement 44 to close the clamp portions 16 onto the lines 14.

It is to be appreciated that the clamp portions 16 of the line spacer 12 are then secured. Note that within FIG. 5, the motors 64 were then used to drive the driver head/lead screw 62 into the clamp portions 16, locking the spacer 12 onto the lines 14.

Turning to FIG. 6, the figure shows the line spacer 12 fully installed and released from the drone system 10. Notice the two arms 42 have been pulled relatively outward by the linear actuator of the control arrangement 44 and the compression modules (e.g., the brackets 48 and the motors 64 located thereon) have been driven back, via motors 52, to their retracted positions. Within the shown example, such steps are needed to allow the spacer 12 to be fully released from the drone system 10.

Of course, the above-mentioned sequence (e.g., method steps) may be repeated for a subsequent line spacer at a different (e.g., subsequent) location.

Again, it is to be appreciated that the shown example is just an example and it not to be taken as a limitation upon the scope of the present disclosure. Variations are contemplated and are within the scope of the present disclosure.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An automated drone system for installing a line spacer upon lines, the system comprising:
   a portion for holding and releasing the line spacer onto the lines;
   a portion for actuating securing portions of the line spacer to secure the line spacer upon the lines; and
   a flying drone portion for levitation of the portion for holding and releasing and the portion for actuating to the lines, wherein:
      the portion for holding and releasing is supported below the flying drone portion;
      the flying drone portion levitates the portion for holding and releasing while the portion for holding and releasing is supported below the flying drone portion; and
      the portion for actuating operates while the portion for holding and releasing is supported below the flying drone portion and levitated by the flying drone portion.

2. The system as set forth in claim 1, wherein the portion for holding and releasing the line spacer comprises arms.

3. The system as set forth in claim 2, wherein the arms are configured to deflect to release the line spacer subsequent to the line spacer being secured upon the lines.

4. The system as set forth in claim 1, wherein the line spacer comprises respective portions to be compressed upon each of the lines, the portion for actuating securing portions of the line spacer comprises a portion for compressing the respective portions of the line spacer.

5. The system as set forth in claim 4, wherein the portion for compressing comprises a motor.

6. The system as set forth in claim 4, including a portion for moving the portion for compressing.

7. The system as set forth in claim 6, wherein the portion for moving comprises a motor.

8. The system as set forth in claim 1, wherein the securing portions of the line spacer comprise a fastener, and the portion for actuating the securing portions comprises a portion for actuating the fastener.

9. The system as set forth in claim 8, wherein the portion for actuating the fastener comprises a motor.

10. The system as set forth in claim 1, wherein the securing portions of the line spacer comprise a clamp, and the portion for actuating the securing portions comprises an arm to close the clamp.

11. A method of installing a line spacer upon lines with a system, the method comprising:
    flying the system, via operation of a drone portion of the system, to levitate the system to the lines;
    holding, via a holding portion of the system, the line spacer while flying the system with the drone portion of the system;
    releasing the line spacer from the holding portion onto the lines while flying the system with the drone portion of the system; and
    actuating securing portions, via operation of a portion of the system, of the line spacer to secure the line spacer upon the lines while flying the system with the drone portion of the system.

12. The method as set forth in claim 11, wherein holding the line spacer comprises holding the line spacer with arms of the holding portion.

13. The method as set forth in claim 12, wherein releasing the line spacer comprises deflecting the arms.

14. The method as set forth in claim 11, wherein actuating the securing portions comprises compressing portions of the line spacer to secure the line spacer upon the lines.

15. The method as set forth in claim 14, wherein compressing the portions comprises actuating a motor to compress the portions.

16. The method as set forth in claim 11, wherein actuating the securing portions comprises actuating compressing portions to compress portions of the line spacer to secure the line spacer upon the lines.

17. The method as set forth in claim 16, wherein actuating the compressing portions comprises actuating a motor to actuate the compressing portions.

18. An automated drone system for installing a line spacer upon lines, the system comprising:
    a portion for holding and releasing the line spacer onto the lines such that a first portion of the line spacer is secured to a first line of the lines and a second portion of the line spacer is secured to a second line of the lines;
    a first portion for actuating a first securing portion of the line spacer to secure the first portion of the line spacer to the first line; and a flying drone portion for levitation of the portion for holding and releasing and the first portion for actuating to the lines, wherein:
- the portion for holding and releasing is supported below the flying drone portion;
- the flying drone portion levitates the portion for holding and releasing while the portion for holding and releasing is supported below the flying drone portion; and
- the first portion for actuating operates while the portion for holding and releasing is supported below the flying drone portion and levitated by the flying drone portion.

19. The system as set forth in claim 18, wherein:
the first portion for actuating the first securing portion comprises a motor.

20. The system as set forth in claim 18, comprising:
a second portion for actuating a second securing portion of the line spacer to secure the second portion of the line spacer to the second line.

* * * * *